United States Patent
Mouslmani et al.

(10) Patent No.: US 12,034,887 B1
(45) Date of Patent: Jul. 9, 2024

(54) SYSTEMS AND METHODS FOR SYNCHRONIZING AGENT STAFFING AND CUSTOMER CALL VOLUME IN CONTACT CENTERS

(71) Applicant: GENESYS CLOUD SERVICES, INC., Menlo Park, CA (US)

(72) Inventors: Taleb John Mouslmani, Menlo Park, CA (US); Therese M. Ferris, Menlo Park, CA (US); Travis Dale Coleman, Menlo Park, CA (US); Mathew Scott Danish, Menlo Park, CA (US)

( * ) Notice: Subject to any disclaimer, the term of this patent is extended or adjusted under 35 U.S.C. 154(b) by 0 days.

(21) Appl. No.: 18/121,237

(22) Filed: Mar. 14, 2023

Related U.S. Application Data

(60) Provisional application No. 63/435,110, filed on Dec. 23, 2022.

(51) Int. Cl.
*H04M 3/523* (2006.01)
*G06Q 10/0631* (2023.01)
*H04M 3/493* (2006.01)
*H04M 3/51* (2006.01)

(52) U.S. Cl.
CPC .... *H04M 3/5238* (2013.01); *G06Q 10/06311* (2013.01); *H04M 3/493* (2013.01); *H04M 3/5175* (2013.01); *H04M 3/5231* (2013.01); *H04M 2203/402* (2013.01); *H04M 2203/551* (2013.01); *H04M 2203/558* (2013.01)

(58) Field of Classification Search
CPC .. G06Q 10/06311; H04M 3/493; H04M 3/51; H04M 3/5175; H04M 3/523; H04M 3/5231; H04M 3/5238; H04M 2203/402; H04M 2203/551; H04M 2203/558

USPC .......... 379/210.01, 265.01, 265.02, 265.1, 379/266.06
See application file for complete search history.

(56) References Cited

U.S. PATENT DOCUMENTS

| | | | | |
|---|---|---|---|---|
| 8,175,257 B1 * | 5/2012 | Shaffer | ............... | H04M 3/5238 379/266.03 |
| 8,638,925 B1 * | 1/2014 | Billman | .............. | H04M 3/5191 379/265.14 |
| 8,681,966 B1 * | 3/2014 | Le Gouez | ........... | H04M 3/5231 379/142.1 |

(Continued)

OTHER PUBLICATIONS

International Search Report and Written Opinion in co-pending PCT application having application No. PCT/US2023/083304.

*Primary Examiner* — Harry S Hong

(57) ABSTRACT

A method for synchronizing agent staffing and customer call volume within a contact center estimates the number of agents to staff the contact center during a future time and uses historical data to estimate the number of customer calls anticipated during the future time. The method performs a first comparison of the number of agents with the anticipated customer calls volume for the future time and then determines at least one preferred contact-center callback window. The method communicates with the customer to request at least one preferred customer-selected callback time and performs a second comparison to provide the customer with a suggested callback time that is selected to synchronize the customer call volume with the number of agents, the preferred contact-center callback window, and the preferred customer-selected callback time to improve the customer's experience and efficiency of the contact center.

20 Claims, 3 Drawing Sheets

(56) References Cited

U.S. PATENT DOCUMENTS

| | | | | |
|---|---|---|---|---|
| 10,659,611 | B1* | 5/2020 | Jangale | H04M 3/5231 |
| 2002/0101977 | A1* | 8/2002 | Takeuchi | H04M 3/523 |
| | | | | 379/242 |
| 2005/0232409 | A1* | 10/2005 | Fain | H04M 3/5231 |
| | | | | 379/210.01 |
| 2006/0167729 | A1* | 7/2006 | Rafter | G06Q 10/1095 |
| | | | | 705/7.19 |
| 2006/0256949 | A1* | 11/2006 | Noble | H04M 3/5231 |
| | | | | 379/266.01 |
| 2007/0041565 | A1* | 2/2007 | Williams | H04M 3/5231 |
| | | | | 379/265.02 |
| 2010/0091971 | A1* | 4/2010 | Famous | H04M 3/5231 |
| | | | | 379/210.01 |
| 2012/0163578 | A1* | 6/2012 | Dhir | H04M 3/5183 |
| | | | | 379/210.01 |
| 2013/0322615 | A1* | 12/2013 | Oristian | H04M 3/5231 |
| | | | | 379/266.06 |
| 2018/0376003 | A1* | 12/2018 | Shinseki | G06Q 10/10 |
| 2023/0057008 | A1* | 2/2023 | DiMaria | H04M 3/5231 |

\* cited by examiner

SYSTEMS AND METHODS FOR SYNCHRONIZING AGENT STAFFING AND CUSTOMER CALL VOLUME IN CONTACT CENTERS

CROSS-REFERENCE TO RELATED APPLICATIONS

This application claims priority to U.S. provisional application 63/435,110, filed Dec. 23, 2022, titled "SYSTEMS AND METHODS FOR SYNCHRONIZING AGENT STAFFING AND CUSTOMER CALL VOLUME IN CONTACT CENTERS", the contents of which are incorporated herein by reference in their entirety.

BACKGROUND

The present invention generally relates to the field of contact centers, and more specifically to managing customer call volumes and agent staffing within the contact centers. More particularly, but not by way of limitation, the present invention pertains to managing customer call routing decisions to improve customer call intervals in overloaded contact centers, to reduce hold times for the customer, and optimize or synchronize agent staffing with customer call volume.

BRIEF DESCRIPTION OF THE INVENTION

The present invention includes a method for synchronizing agent staffing and customer call volume within a contact center. The method includes estimating a number of agents that will staff the contact center during a specified future time, using historical data to estimate a number of customer calls anticipated during the specified future time, and performing a first comparison of the number of agents with the anticipated customer calls for the specified future time. Based on the first comparison, the method further includes determining one or more preferred contact-center callback windows within the specified future time, wherein the one or more preferred contact-center callback windows are selected based on an overall customer call volume with the estimated number of agents staffing the contact center during the specified future time. Next, the method includes communicating with a customer to request one or more preferred customer-selected callback times and then performing a second comparison of the one or more preferred contact-center callback windows with the one or more preferred customer-selected callback times. Based on the second comparison, the method further includes providing the customer with one or more suggested callback times, wherein the one or more suggested callback times are selected to synchronize the overall customer call volume with the number of agents staffing the contact center, the preferred contact-center callback windows, and the preferred customer-selected callback times to improve a customer experience and contemporaneously improve an efficiency of the contact center during the specified time.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

DETAILED DESCRIPTION

Figure 1:
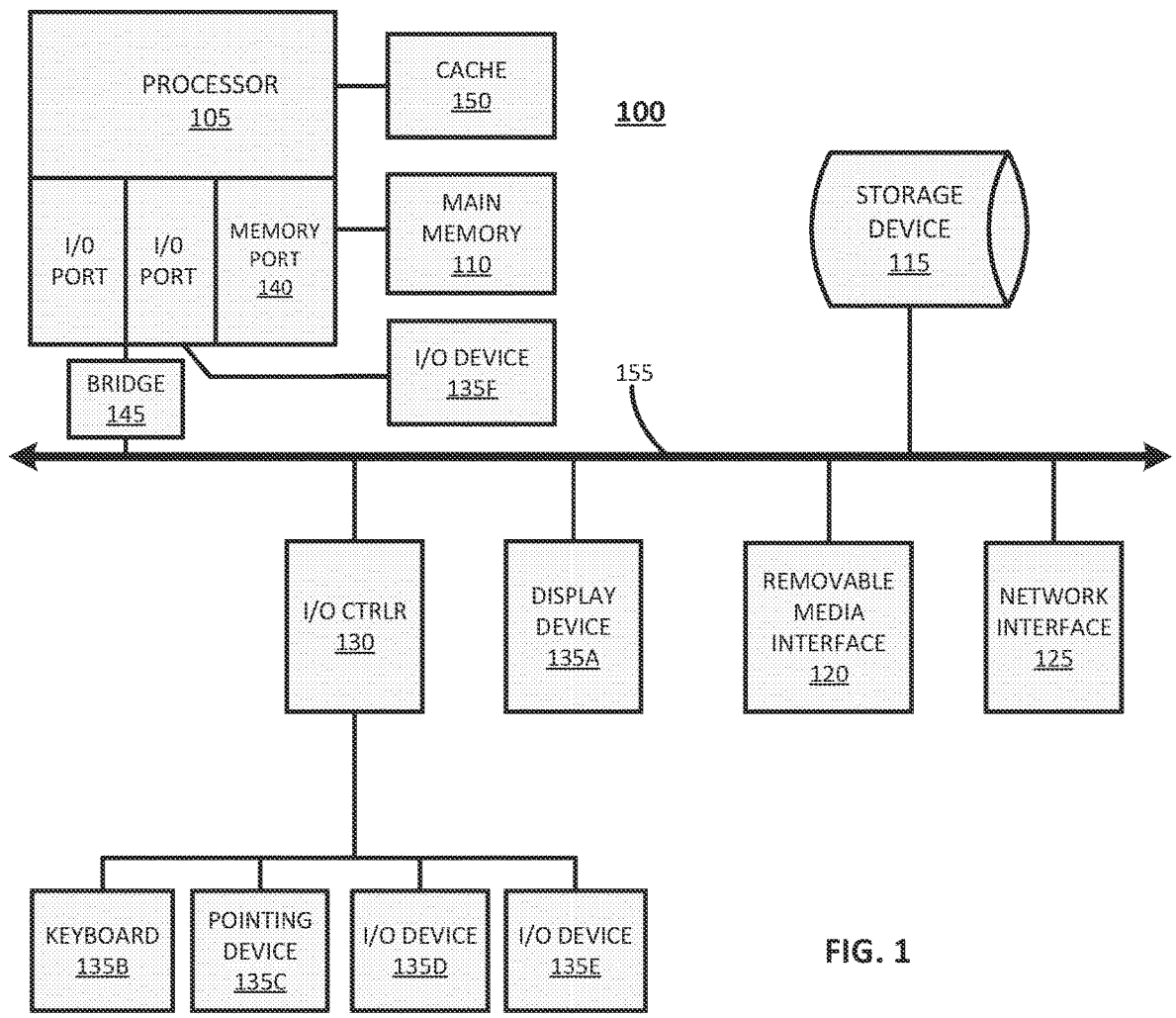
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure, or characteristic described in connection with the given example may be included in at least one embodiment of the present invention. Particular features, structures or characteristics may be combined in any suitable combinations and/or sub-combinations in one or more embodiments or examples. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Figure 2:
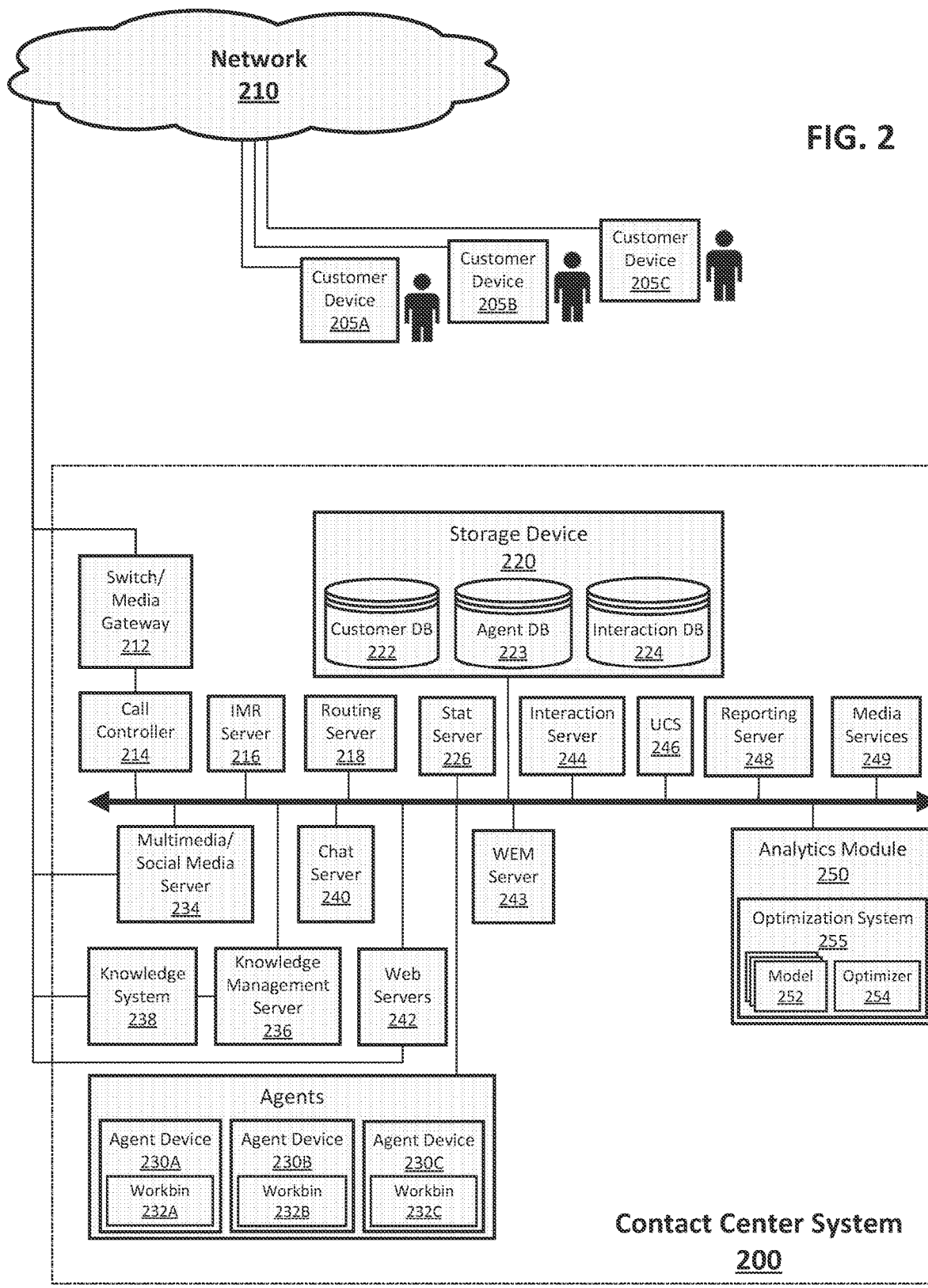
FIG. 2 depicts a schematic block diagram of a communications infrastructure or contact center in accordance with exemplary embodiments of the present invention and/or with which exemplary embodiments of the present invention may be enabled or practiced.

Before proceeding with a detailed description of the present invention, an exemplary computing device and contact center system will be discussed in relation to FIGS. 1 and 2, respectively. As will be understood by one of ordinary skill in the art, the computing device and contact center system are provided as an exemplary environment in which aspects of the present disclosure could be readily implemented, though it should be understood that the methods and systems disclosed herein may not limited to such use unless expressly stated herein. Accordingly, the following description related to FIGS. 1 and 2 is meant to provide general discussion regarding enabling technology as well as background information on contact center systems and the operation thereof. Discussion specifically related to the present invention will continue with reference to FIG. 3, where the manner of its implementation and operation in similar and analogous environments will be provided.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit or processor 105 and a main memory 110. The computing device 100 may also include a storage device 115, removable media interface 120, network interface 125, input/output controller 130, and one or more input/output devices 135, which as depicted may include an, display device 135A, keyboard 135B, and pointing device 135C. The computing device 100 further may include additional elements, such as a memory port 140, a bridge 145, input/output ports, one or more additional input/output devices 135D, 135E, 135F, and a cache memory 150 in communication with the processor 105.

The processor 105 may be any logic circuitry that processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of input/output devices 135, one or more of which may be connected via the input/output controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the input/output devices 135 may include any conventional devices for performing the functionality described herein.

Unless otherwise restricted, the computing device 100 may be any workstation, desktop computer, laptop or notebook computer, server machine, virtualized machine, mobile or smart phone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network ("PSTN"), wireless carrier network, local area network, private wide area network, public wide area network, such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized.

Contact Center

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" may be used herein to refer to the system depicted in FIG. 2 and/or the components thereof, while the term "contact center" may be used more generally to refer to a customer service provider (such as a particular customer service provider providing customer services through the contact center system 200), and/or the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, contact centers generally strive to provide quality services to customers while minimizing costs and/or maximizing efficiency. Contact centers may include many different systems and modules—such as those shown in exemplary contact center system 200—in furtherance of this aim. The contact center system 200 may engage and manage interactions in which automated processes (or bots) or human agents communicate with customers. As should be understood, the contact center system 200 may be an in-house facility to a business or enterprise for performing the functions of sales and customer service. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment. The contact center system 200 may include software applications executed on premises and/or remotely. The various components of the contact center system 200, thus, may be distributed across various geographic locations and/or housed locally.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with FIG. 2, the components or modules of the contact center system 200 may include: a plurality of customer devices 205A, 205B, 205C; communications network (or simply "network") 210; switch/media gateway 212; call controller 214; interactive media response ("IMR") server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; workforce engagement management ("WEM") server 243; interaction server 244; universal contact server (or "UCS") 246; reporting server 248; media services server 249; and an analytics module 250. Any of the computer-implemented components, modules, or servers described in relation to FIG. 2 or in any of the following figures may be implemented via any type of computing devices, including the example computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network, local area network, private wide area network, and/or public wide area network, such as the Internet. Further, the network 210 may include any wireless carrier network.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange ("PBX"), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230. As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration software for interfacing with the switch/media gateway and other components. The call controller 214 may include a session initiation protocol ("SIP") server for processing SIP calls. The call controller 214 may also extract data about an incoming interaction, such as the customer's telephone number, IP address, or email address, and then communicate these with other contact center components in processing the interaction.

In regard to the interactive media response ("IMR") server 216, it may be configured to enable self-help or virtual assistant functionality. Specifically, the IMR server 216 may be similar to an interactive voice response ("IVR") server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the router or routing server 218, it may function to route incoming interactions. The routing server 218 may perform predictive routing whereby incoming interactions are routed to resources calculated to deliver the best result for the customer and/or contact center. For example, functionality within the routing server 218 may select the most appropriate agent and route the communication thereto. The agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent provides to the customer.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement, and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage, and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the WEM server 243, it may be configured to host and enable a suite of features focused on improving employee engagement in contact centers, which may be referred to broadly as "workforce engagement management" (or "WEM"). The WEM server 243 may provide solutions that simplify the agent experience and help drive results and employee satisfaction. The WEM server 243 may include capabilities such as call recording, screen recording, quality management, performance management, speech and text analytics, gamification, as well as capabilities related to workforce management (or "WFM") and workforce optimization ("WFO"). In general, WFM makes sure that the right resource is there at the right time for service, while WFO provides the ability to monitor and act upon the content of the interactions via quality management and interaction analytics. In addition to those functions, WEM further ensures that the prerequisites for enabling the contact center to provide effective customer service over the long-term by engaging the agents who provide the service. In doing this, the WEM server 243 may provide functionality aimed at allowing contact centers to improve metrics related to employee recognition, churn, and development. Further, WEM recognizes a shift within the contact center industry from focusing on optimizing labor productivity and managing labor costs—i.e., workforce optimization—to a more employee-centric focus that engages agents throughout the employment life cycle. WEM applications are designed to increase agent engagement by automating tasks associated with scheduling, coaching, quality management, performance management and more. More specifically, the WEM server 243 may include core applications such as recording interactions across all channels, quality monitoring with automated scoring, workforce management with AI-infused scheduling and forecasting, performance management, speech and data analytics, and others. The WEM server 243 may further provide features such as gamification, robotic process automation, voice authentication, predictive analytics, chatbots, customer engagement hub, tools for building custom applications, and AI and analytics. For example, AI-infused algorithms can prepare more accurate agent schedules, customer insights, routing, etc., which consider more variables and have greater predictive power. Further, much of the tedious labor involved in quality monitoring can be automated, which saves time and money and improves agent morale. Other functionality may include any of the related features described herein as would be understood and enabled by one of ordinary skill in the art. Such enablement may include connections with any of the other servers, devices and data sources described herein.

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server ("UCS") 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server (or "media server") 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like. The media server 249 may store media content locally. In other embodiments, such as those discussed below in relation to FIGS. 4-5, the media server 249 may augment such functionality by orchestrating the remote storage of media files on agent devices and sharing of those media files between agent devices to achieve desired functionality.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network or deep learning approach is presently a preferred embodiment for implementing the models 252. Such models, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2—as well as those of the other figures included herein—may each include one or more processors executing computer program instructions and interacting with other system components for performing the various functionalities described herein. Such computer program instructions may be stored in a memory implemented using a standard memory device. Although the functionality of each of the servers is described as being provided by the particular server, it should be recognized that the functionality of various servers may be combined or integrated into a single server, or the functionality of a particular server may be distributed across one or more other servers. Further, the terms "interaction" and "communication" are used interchangeably, and generally refer to any real-time and non-real-time interaction that uses any communication channel of the contact center. Access to and control of the components of the contact system 200 may be affected through user interfaces (UIs) that may be generated on the customer devices 205 and/or the agent devices 230.

Figure 3:
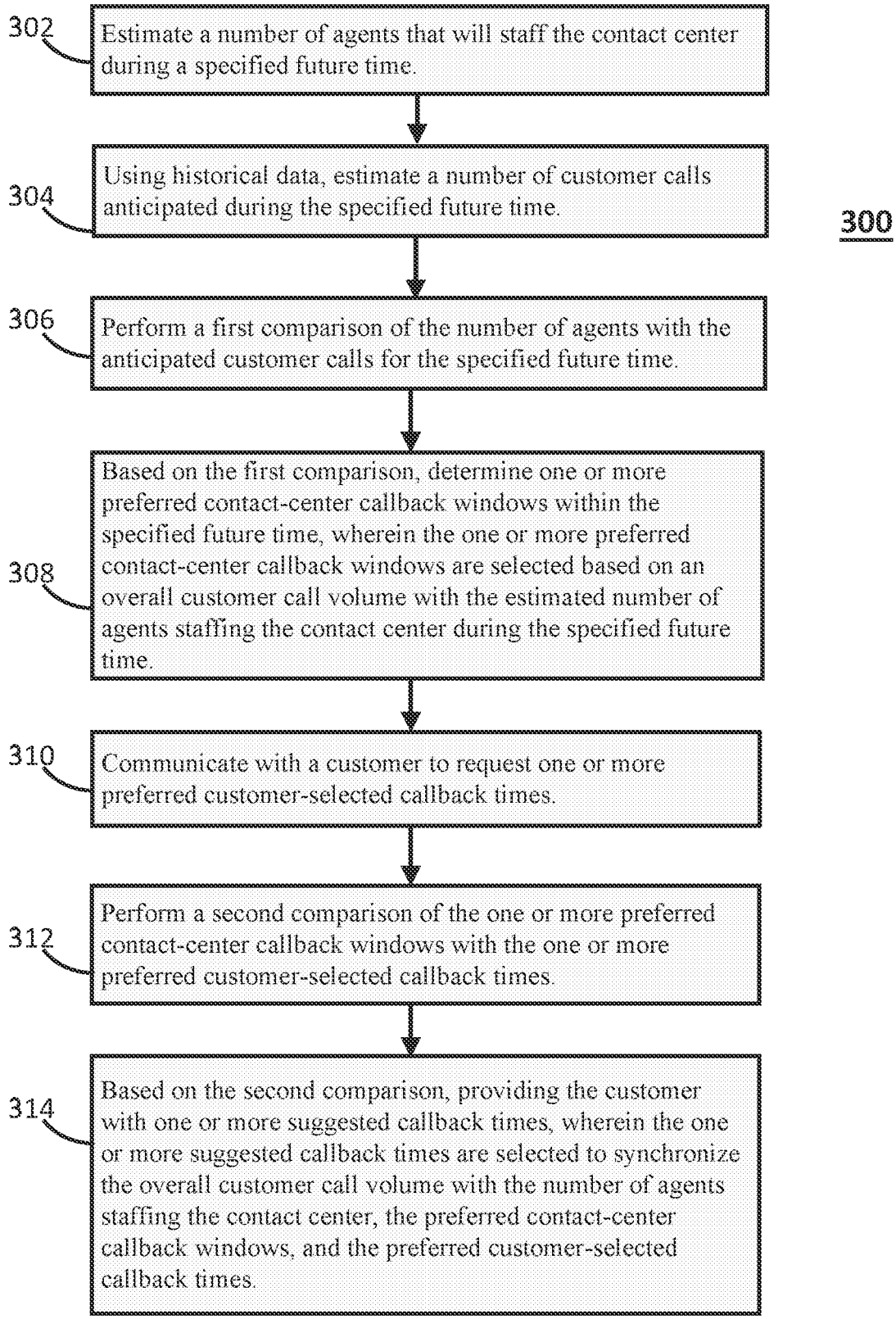
FIG. 3 is chart illustrating a method for synchronizing agent staffing and customer call volume within a contact center according to an embodiment of the present application.

Turning now to FIG. 3, the functionality and operation associated with the present invention will now be discussed in accordance with example embodiments. Before proceeding with this, though, some background as to how a contact center functions will be provided while also highlighting some example operational shortcomings of conventional customer and contact center interactions that the present invention is intended to address.

Contact centers generally attempt to match the number of agents working during a specified time with an anticipated customer call volume to prevent the contact center from becoming overloaded with customer calls, which in turn increases the stress or anxiety of the agents and creates frustration for the customer due to longer-than-normal or excessive wait times. At present, contact centers generally rely on a manager or supervisor (hereinafter "supervisor") to develop staffing plans. If the supervisor is sufficiently experienced, meaning the supervisor has worked at the contact center long enough to understand and appreciate the ebb and flow of the call volume during certain events or times, then the supervisor may be fortunate enough to match agent staffing with call volume without causing too much disruption or chaos. Less experienced supervisors may simply get lucky when matching agent staffing with customer call volume, they may overstaff the contact center, which increases labor costs, or they may understaff the contact center, which increases customer hold times and frustrates the waiting customers. Even experienced supervisors may wildly miss the mark when attempting agent staffing with customer call volume because there are many difficult to predict or unknown variables that may arise. By way of example, some difficult to predict or unknown variables may be, but are not limited to, a new product launch, seasonal events (e.g., back to school or holiday shopping), and changes in laws, rules, or regulations.

Cable and utility companies often deal with excessive customer call volumes during storms or power outages. Sometimes, these companies will offer a limited callback service to the customer in which the customer hears an automated voice offer the customer the option of staying on hold for an agent or receiving a return call at some future, but unknown time. Typically, the automated voice informs the customer that the callback will occur based on the customer's place in the queue as determined by the customer's initial call. However, the customer's place in the queue is much too vague to provide the customer with any meaningful way to anticipate when the callback may occur. Interestingly, the cable and utility companies are probably ahead of the curve in offering the limited callback option because most other companies, to include contact centers, simply make the customer languish on hold for a frustratingly long time.

Accordingly, it should be appreciated that it is difficult to manage the ebb and flow of customer call volumes with agent staffing by relying on the experience of the supervisor or by offering a limited callback service like the cable and utility companies because these types of solutions are too often inexact and inefficient. Another possible solution to the ebb and flow problem is the use of chat bots to reduce the number of calls that are routed to live agents. While chat bot technology is developing at a rapid pace, there may be customers that are uncomfortable interacting with a chat bot and other customers that just demand to speak with a live agent. Thus, a better way to handle the ebb and flow of customer call volumes vis-à-vis agent staffing within a contact center is needed to improve the customer's experience and contemporaneously improve the efficiency of the contact center.

In the present application, methods and systems are proposed to manage the ebb and flow of customer call volumes vis-à-vis agent staffing within a contact center using workforce management (WFM) and interactive voice response (IVR) routing technologies to streamline and improve the experience for the customer and contact center. By way of example, the proposed methods and systems provide transparency for the customer about the best times to call the contact center or by providing the customer various callback windows, which are defined by historical and forecasted call volume data in conjunction with projected staffing needs. The proposed methods and systems operate to modify the model of not only how a contact center engages with a customer, but when the contact center engages with the customer, or vice-versa, by utilizing forecasted call volumes and agent staffing availability to determine when a call or callback works best for the customer while also improving the efficiency of the contact center.

Now specifically referencing FIG. 3, a flow chart 300 discloses a method for synchronizing agent staffing and customer call volume within a contact center by utilizing any of the computer-implemented components, modules, or servers described in relation to FIG. 2. By way of example and in accordance with an embodiment of the present invention, the WEM server 243 (FIG. 2) may be utilized to perform the following steps. At Step 302, the method includes estimating a number of agents that will staff the contact center during a specified future time. By way of example, the specified future time may be a future work shift that needs to be staffed by agents at the contact center. Estimating the number of agents that will staff the contact center during the specified future time may include receiving (e.g., uploading or transmitting) a staffing schedule for the specified future time to the WEM server 243. At Step 304, historical data is used to estimate a number of customer calls anticipated during the specified future time. In one embodiment, the historical data includes, but is not limited to, at least a number of past customer calls received by the contact center during a past time, agent staffing during the past time, average call length during the past time, and customer complaints during the past time. Additionally or alternatively, estimating the number of customer calls anticipated during the specified future time includes determining an average call time for customer calls received during a past time, wherein the specified future time chronologically aligns with the past time.

At Step 306, the method includes performing a first comparison of the number of agents with the anticipated customer calls for the specified future time. By way of example, the first comparison may determine whether the contact center would receive too few calls for the number of agents scheduled for the specified future time or receive too many calls for the number of agents scheduled for the specified future time.

At Step 308 and based on the first comparison, the method further includes determining one or more preferred contact-center callback windows within the specified future time, wherein the one or more preferred contact-center callback windows are selected based on an overall customer call volume with the estimated number of agents staffing the contact center during the specified future time. In one embodiment of the present invention, the first comparison uses an average customer call duration based on a past time that is chronologically similar to the specified future time. The number of callback windows that are identified may vary throughout the work shift due to some agents ending or starting their work shift, other agents departing for a scheduled absence, an increase or decrease in the call volume, or some combination thereof. Additionally or alternatively, determining the preferred contact-center callback windows within the specified future time includes modifying the number of preferred contact-center callback windows based on an anticipated topic to be discussed between the agent and the customer. In the example of a new product launch, the overarching topic may be something the agent can answer quickly, whereas other topics may take a longer explanation by the agent or a more complex dialog between the agent and the customer.

At Step 310, the method includes communicating with the customer to request one or more preferred customer-selected callback times. In one embodiment, such communication includes interacting with the customer using a written communication, a verbal communication, an interactive voice response (IVR) communication, or some combination thereof. By way of example, the IVR communication may include providing the customer with a selectable menu of the preferred contact-center callback windows.

At Step 312, the method includes performing a second comparison of the preferred contact-center callback windows with the preferred customer-selected callback times. In one embodiment, the second comparison operates to match or align the needs of the customer with the demands of the contact center. By way of example, if the preferred contact-center callback windows are labeled as windows A, B, D, and G, and the preferred customer-selected callback times are only within windows A and D, then the method would identify the customer-selected callback times that occurred within windows A and D as the times that should be suggested to the customer.

At Step 314 and based on the second comparison described above, the method further includes providing the customer with one or more suggested callback times. The suggested callback times are selected to synchronize the overall customer call volume with the number of agents staffing the contact center, the preferred contact-center callback windows, and the preferred customer-selected callback times. Thus, the methods and systems of the present invention may operate to synchronize, optimize, and/or align these four variables to improve the customer experience and improve the efficiency of the contact center during the specified time. Additionally, the methods and systems of the present invention may operate to provide transparency to the customer about the best times to call by flattening the curve of the ebb and flow of the contact center call volume, which may beneficially minimize overloading the contact center and reduce hold times for the customer.

As one of skill in the art will appreciate, the many varying features and configurations described above in relation to the several exemplary embodiments may be further selectively applied to form the other possible embodiments of the present invention. For the sake of brevity and considering the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A method for synchronizing agent staffing and customer call volume within a contact center, the method comprising:
   estimating a number of agents that will staff the contact center during a specified future time;
   using historical data, estimating a number of customer calls anticipated during the specified future time;
   performing a first comparison of the number of agents with the anticipated customer calls for the specified future time;
   based on the first comparison, determining one or more preferred contact-center callback windows within the specified future time, wherein the one or more preferred contact-center callback windows are selected based on an overall customer call volume with the estimated number of agents staffing the contact center during the specified future time;
   communicating with a customer to request one or more preferred customer-selected callback times;
   performing a second comparison of the one or more preferred contact-center callback windows with the one or more preferred customer-selected callback times; and
   based on the second comparison, providing the customer with one or more suggested callback times, wherein the one or more suggested callback times are selected to synchronize the overall customer call volume with the number of agents staffing the contact center, the preferred contact-center callback windows, and the preferred customer-selected callback times to improve a customer experience and contemporaneously improve an efficiency of the contact center during the specified time.

2. The method of claim 1, wherein the historical data includes at least a number of past customer calls received by the contact center during a past time, agent staffing during the past time, average call length during the past time, and customer complaints during the past time.

3. The method of claim 1, wherein estimating the number of agents that will staff the contact center during the specified future time includes receiving a staffing schedule for the specified future time.

4. The method of claim 1, wherein estimating the number of customer calls anticipated during the specified future time includes determining an average call time for customer calls received during a past time, wherein the specified future time chronologically aligns with the past time.

5. The method of claim 1, wherein performing the first comparison of the number of agents with the anticipated customer calls for the specified future time includes determining whether the contact center would receive too few calls for the number of agents scheduled for the specified future time or receive too many calls for the number of agents scheduled for the specified future time.

6. The method of claim 5, wherein the first comparison uses an average customer call duration based on a past time that is chronologically similar to the specified future time.

7. The method of claim 1, wherein determining the one or more preferred contact-center callback windows within the specified future time includes modifying the number of preferred contact-center callback windows based on an anticipated topic to be discussed between the agent and the customer.

8. The method of claim 1, wherein communicating with the customer to request the one or more preferred customer-selected callback times includes interacting with the customer using a written communication, a verbal communication, an interactive voice response (IVR) communication, or some combination thereof.

9. The method of claim 8, wherein the IVR communication includes providing the customer with a selectable menu of the preferred contact-center callback windows.

10. The method of claim 1, wherein providing the customer with one or more suggested callback times includes interacting with the customer using an interactive voice response (IVR) communication; and
wherein the IVR communication includes providing the customer with a selectable menu of the suggested callback times.

11. A system for synchronizing agent staffing and customer call volume within a contact center, the system comprising:
a database of past customer calls received by the contact center;
a processor; and
a memory, wherein the memory stores instructions that, when executed by the processor, cause the processor to perform the steps of:
determining a number of agents that will staff the contact center during a specified future time;
using the database of past customer calls, estimating a number of customer calls anticipated during the specified future time;
performing a first analysis of the number of agents as compared with the estimated customer calls for the specified future time;
based on the first analysis, determining one or more preferred contact-center callback windows within the specified future time, wherein the one or more preferred contact-center callback windows are selected based on an overall customer call volume with the estimated number of agents staffing the contact center during the specified future time;
communicating with a customer to request one or more preferred customer-selected callback times;
performing a second analysis of the one or more preferred contact-center callback windows with the one or more preferred customer-selected callback times; and
based on the second analysis, providing the customer with one or more suggested callback times, wherein the one or more suggested callback times are selected to synchronize the overall customer call volume with the number of agents staffing the contact center, the preferred contact-center callback windows, and the preferred customer-selected callback times to improve a customer experience and contemporaneously improve an efficiency of the contact center during the specified future time.

12. The system of claim 11, wherein communicating with the customer to request one or more preferred customer-selected callback times includes using the workforce management system to provide an automated message to the customer or using the workforce management system to provide an automated message to at least one of the agents for transmission to the customer.

13. The system of claim 11, wherein providing the customer with one or more suggested callback times includes using the workforce management system to provide an automated message to the customer or using the workforce management system to provide an automated message to at least one of the agents for transmission to the customer.

14. The system of claim 11, wherein providing the customer with one or more suggested callback times to contemporaneously improve an efficiency of the contact center includes flattening a call volume curve during the specified future time.

15. The system of claim 11, wherein the database of past customer calls includes at least a number of past customer calls received by the contact center during a past time, agent staffing during the past time, average call length during the past time, and customer complaints during the past time.

16. The system of claim 11, wherein performing the first analysis includes determining whether the contact center would receive too few calls for the number of agents scheduled for the specified future time or receive too many calls for the number of agents scheduled for the specified future time.

17. The system of claim 11, wherein determining the one or more preferred contact-center callback windows within the specified future time includes modifying the number of preferred contact-center callback windows based on an anticipated topic to be discussed between the agent and the customer.

18. The system of claim 11, wherein communicating with the customer to request the one or more preferred customer-selected callback times includes interacting with the customer using a written communication, a verbal communication, an interactive voice response (IVR) communication, or some combination thereof.

19. The system of claim 18, wherein the IVR communication includes providing the customer with a selectable menu of the preferred contact-center callback windows.

20. The system of claim 11, wherein providing the customer with one or more suggested callback times includes interacting with the customer an interactive voice response (IVR) communication; and
wherein the IVR communication includes providing the customer with a selectable menu of the suggested callback times.

* * * * *